2 Sheets—Sheet 1.

J. HARRIS.

ELECTRIC METER.

No. 11,588. Reissued Feb. 2, 1897.

WITNESSES:

J. E. Harris

A. M. Turner.

INVENTOR

Jesse Harris

BY

H. W. Brown

ATTORNEY

2 Sheets—Sheet 2.

J. HARRIS.

ELECTRIC METER.

No. 11,588. Reissued Feb. 2, 1897.

WITNESSES:

J. E. Harris

A. M. Turner

INVENTOR

Jesse Harris

BY W. M. Brown

ATTORNEY

UNITED STATES PATENT OFFICE.

JESSE HARRIS, OF LYNN, MASSACHUSETTS.

ELECTRIC METER.

SPECIFICATION forming part of Reissued Letters Patent No. 11,588, dated February 2, 1897.

Original No. 543,865, dated August 6, 1895. Application for reissue filed October 18, 1895. Serial No. 566,160.

*To all whom it may concern:*

Be it known that I, JESSE HARRIS, of Lynn, in the county of Essex, in the State of Massachusetts, have invented new and useful Improvements in Electric Meters, of which the following, taken in connection with the accompanying drawings, is a full, clear, and exact description.

My invention relates to meters, and particularly to that class designed for measuring and automatically recording the strength or force of the current in any electrical circuit and the length of the time during which the current is flowing, and conversely the time during which the current flows or electrically is used.

My object is to produce a meter which will register power used and as it is used, comprising a paper strip fed regularly by clockwork, a pencil mounted upon a slide, a rack-bar connected to the slide, a gear engaging with said rack-bar to reciprocate, a motor driving said gear when the circuit is closed, according to the strength of the current, said current passing through the current-coil, producing a torque upon the pressure-coil, which throws it to the right, and through the connection to a reversing-switch causes the motor to turn in such direction as to wind up a coil or spiral spring until the torque of the spring balances the torque of the current and pressure-coil, when it stops; but this has operated also to throw the pencil outward upon the moving paper, and as the paper is fed continuously the pencil will mark a straight line so long as this balance continues, and as the current diminishes in force and consequently reduces the torque upon the pressure-coil, which is overcome by the spring and thrown to the left, causing the motor to be run backward until the spring is proportionately uncoiled and the pencil drawn back, will mark the paper accordingly and according to the fluctuations of the strength of the current, and the paper being graduated as a chart the pencil-line will thus, by its variations, indicate and record the number of watts passing through the meter; and in meters which are in circuit for long periods of time, or where a chart is not desired, a dial device is substituted, which gives the addition of the watt-hours passing the meter in a given time between readings. It is constructed as follows, reference being had to the accompanying drawings, in which—

Figure 1:
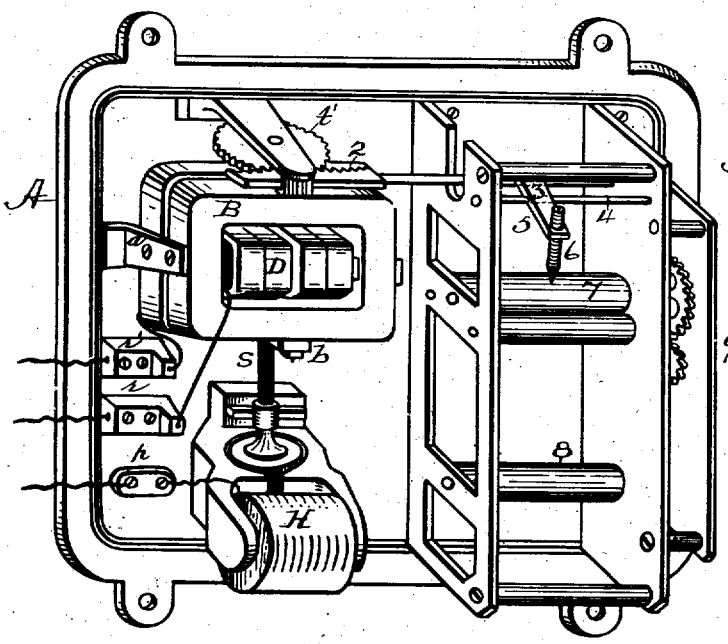
Figure 3:
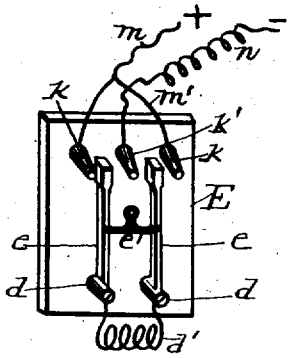
Figure 2:
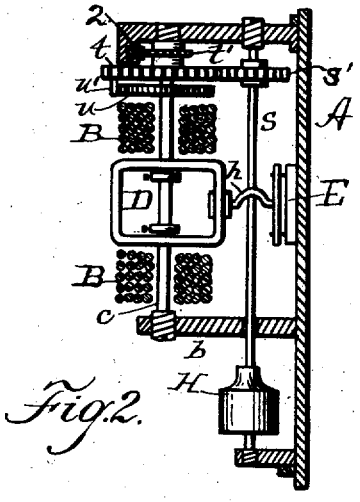
Figure 6:
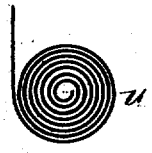
Figure 7:
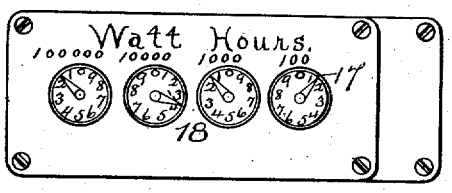
Figure 8:
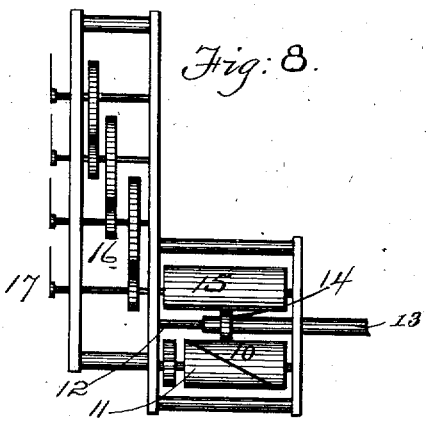
Figure 4:
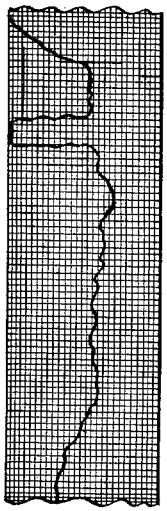
Figure 9:
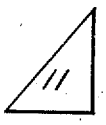
Figure 5:
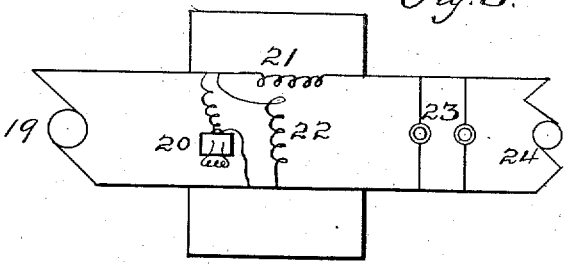

Figure 1 is a plan perspective of the meter with the outer case or cover removed. Fig. 2 is a vertical sectional elevation on a line through the field-coil and by the side of the pressure-coil. Fig. 3 is a front elevation of the reversing-switch. Fig. 4 is a plan of part of a chart as marked by the pencil for recording watts. Fig. 5 is a plan of the circuits. Fig. 6 is a plan of the coil-spring. Fig. 7 is a front elevation of a watt-hour indicator or recorder. Fig. 8 is a side elevation of the same. Fig. 9 is a plan of the pieces of leather upon the roller which is driven by clockwork in the watt-hour mechanism.

A is the base or back upon which the brackets *a* are mounted and which carry the field or current coil B, which is of ordinary construction. An arm *b* is also secured to said back, and in it a stud is screwed, in the bottom of which is a bearing in which the shaft *c* is stepped, and D is the pressure-coil mounted upon said shaft. A reversing or circuit-changing switch E is mounted upon said back and provided with the posts *d*, to which the wires *d'*, leading to the motor-armature, are connected and to which the springs *e* are connected, said springs being connected by an insulated cross-bar *e'*, to which the arm *h* upon the pressure-coil is connected. It is further provided with the contact-posts *k* and *k'*, to which the wires *m m'* and *n* are connected. The wires *m m'* are connected to one side of the circuit and the wires *n*, in case of a series-wound motor, through the field of the motor to the other side and in a shunt-wound motor direct to the other side of the circuit. H is a motor of ordinary construction connected to the switchboard in any ordinary manner, and *p* is the pressure-wire terminal, while *r r'* are the terminals for the current-wires.

When a circuit is closed, the torque produced on the pressure-coil operates the switch in the usual manner. At the same time the motor rotates the shaft S and the gear *s'*, which engages with and actuates the gear *t*, which is loose upon the stud, but which is connected to the spring *u*, as by means of a stud *u'*, the inner end of said spring being connected to shaft *c*. Thus the rotation of the motor produces a torsion upon the spring at one end, while the torque of the pressure-coil produces a wind-up strain upon the other end, and when thus automatically produced the torque of the spring balances the torque of the coil. The maximum strength of the current is recorded by the apparatus for that purpose, actuated by the motor-shaft. A gear *t'* is secured to the gear *t* and is shown as somewhat above it, as upon the end of its hub, and the rack-bar 2 is engaged by the gear *t'* and is connected to a slide 3, which is mounted and adapted to be reciprocated in or upon ways 4 and carrying the arm 5, in which the pencil 6 is held, having its point in contact with the paper strip *v*, which is being wound over the roll 7 from the roll 8, the roll 7 being rotated by the clockwork 9. When the circuit is closed and the motor actuates the gear *t*, as aforesaid, the rack-bar is thrown over to the right and the pencil-point carried with it and marks the paper, making a line which shows precisely and accurately the number of watts passing through the meter, according to the transverse graduation upon the paper and the time by the lateral graduation. When the torque of the coil is balanced, the pencil-point will indicate it by the apex of its marking, and so long as such balance is maintained the pencil will make its mark in a direct line longitudinally to the paper, and every variation in the strength of the current will be indicated by the marking, and when the circuit is broken the pencil will mark a straight line to the left-hand margin of the paper.

Where meters are in use for long periods or a chart is not desired, a dial mechanism of ordinary construction is substituted, consisting, briefly considered, of the following parts: A roller 10, having a partial cover of leather 11, is driven continuously by a clockwork, and a rod 12 is mounted in the frame, upon which is a hollow or tubular spindle 13, loosely mounted and adapted to be reciprocated and provided with a loose wheel 14, the outer end of said spindle being connected to the rack-bar, and by said rack-bar movements, through the rotation of the gear *t*, said roller is advanced and brought into contact with the leather on said roller and rotated and by its rotation rotates the roller 15, the shaft 16, and the pointer 17, and also intermittently actuates the other pointers successively upon the dials 18 through the gearing, substantially as shown.

In Fig. 5 I show a plan of the circuits, 19 being the generator, 20 the motor-circuit, 21 the current-coil circuit, 22 the pressure-coil circuit, 23 the lamps, and 24 the motors, all of which are known to electricians.

The purpose of the reversing-switch is to control the motion and direction of the motor, in order to obtain a continuous balance between the torsion-coil and the pressure-coil—that is to say, when the current is turned on, or the then flowing current be increased, then the torque of the pressure coil would overcome the spring, the pressure-coil would turn upon the shaft to the right, throw the contacts on the switch, Fig. 3, to the right, and cause the motor to rotate to wind up the spring until its torque balanced the torque on the pressure-coil, whereupon the contacts would break away from the posts *k k'* on the right, and the motor would stop. Then if the current be decreased or cut off the strain of the spring would overcome the lessened torque on the pressure-coil, which would move on its shaft and throw the contacts on the switch to the left into contact with the posts *k k'*, when the motor would revolve in the opposite direction and unwind the spring until the balance was again obtained and the meter-circuit opened.

Having described my invention, what I claim, and desire to secure by Letters Patent, is—

1. The combination with a pressure-coil and a motor, of a torsion-spring connected to said coil and to said motor, whereby the torsion of the spring automatically balances the torque of the coil.

2. A pressure-coil and its supporting-shaft, in combination with a spring connected to said shaft and brought under tension by the torque of said coil.

3. A pressure-coil mounted upon a shaft, a spring connected to said shaft and to a motor, and a motor in combination.

4. A pressure-coil mounted upon a shaft, a spring connected to said shaft and to a motor, a current-coil and a motor, and means to record the current passing through the current and pressure coils.

5. In a registering device a reciprocating arm having a loose pulley or roller connected therewith and lying between revoluble rollers, one of said rollers being arranged to be continuously revolved and having a portion of its face raised and arranged so that when the reciprocating arm is moved longitudinally the loose roller on said arm will be brought into and thrown out of contact with said raised surface on the continuously-revolving roller and arranged so that when the loose roller on the arm is revolved by said raised surface, its motion will be communicated to the other roller and to a train of gears and to a plurality of indicating-pointers substantially as described.

6. A pressure-coil arranged to have rotation and a resilient device connected with the pressure-coil and with a motor, a current-coil and a motor, and means to record the current passing through the current and pressure coils substantially as described.

In testimony whereof I affix my signature in presence of two witnesses.

JESSE HARRIS.

Witnesses:
W. M. BROWN,
HOWARD HENDRICKSON.